March 26, 1929.  N. W. DORMAN  1,706,600
CLUTCH
Filed Oct. 29, 1925   4 Sheets-Sheet 1

Inventor
Neal W. Dorman,
By Owen & Owen
Attorneys

March 26, 1929.　　N. W. DORMAN　　1,706,600
CLUTCH
Filed Oct. 29, 1925　　4 Sheets-Sheet 2

Inventor
Neal W. Dorman
By Owen & Owen
Attorneys

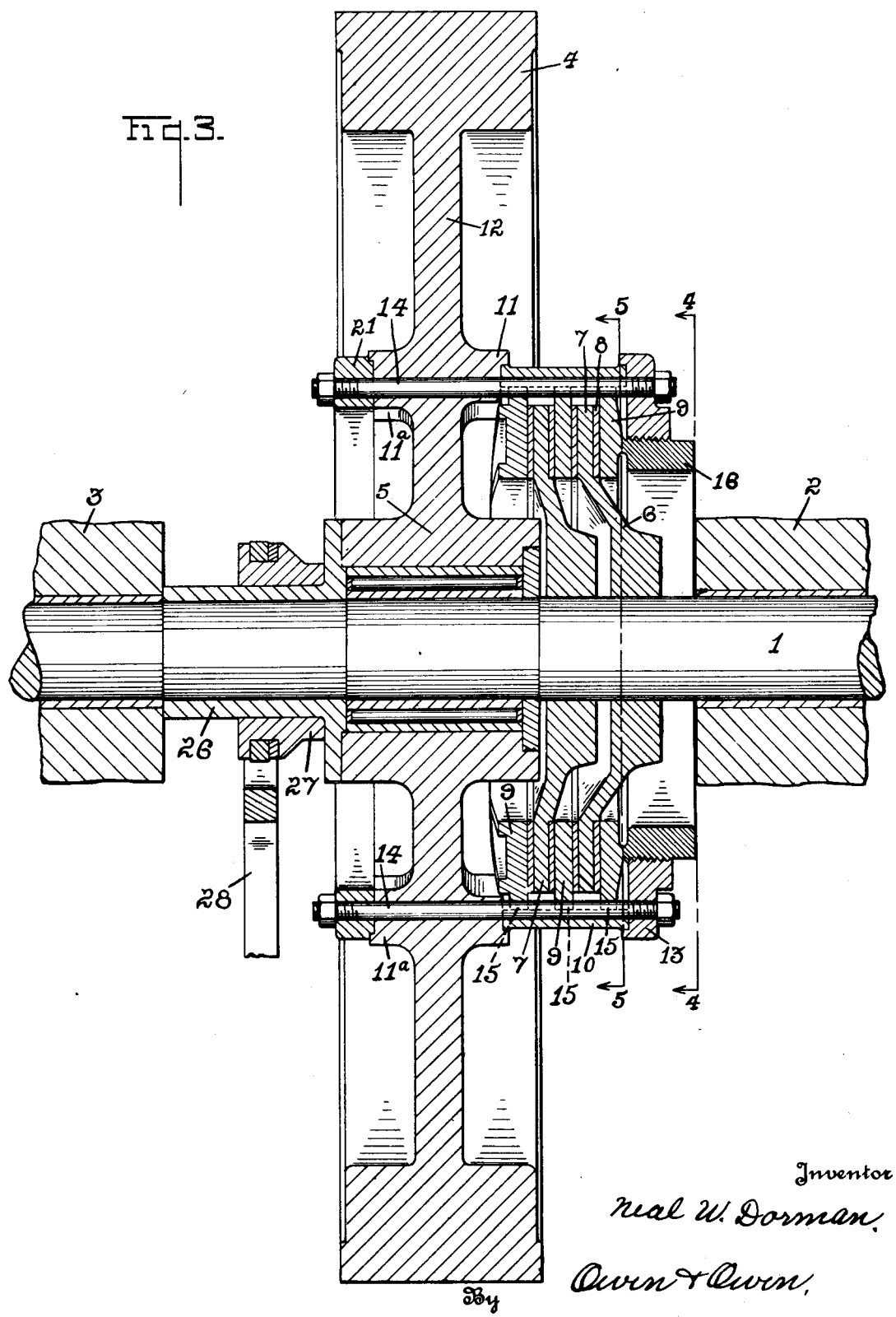

March 26, 1929.　　　N. W. DORMAN　　　1,706,600
CLUTCH
Filed Oct. 29, 1925　　　4 Sheets-Sheet 4
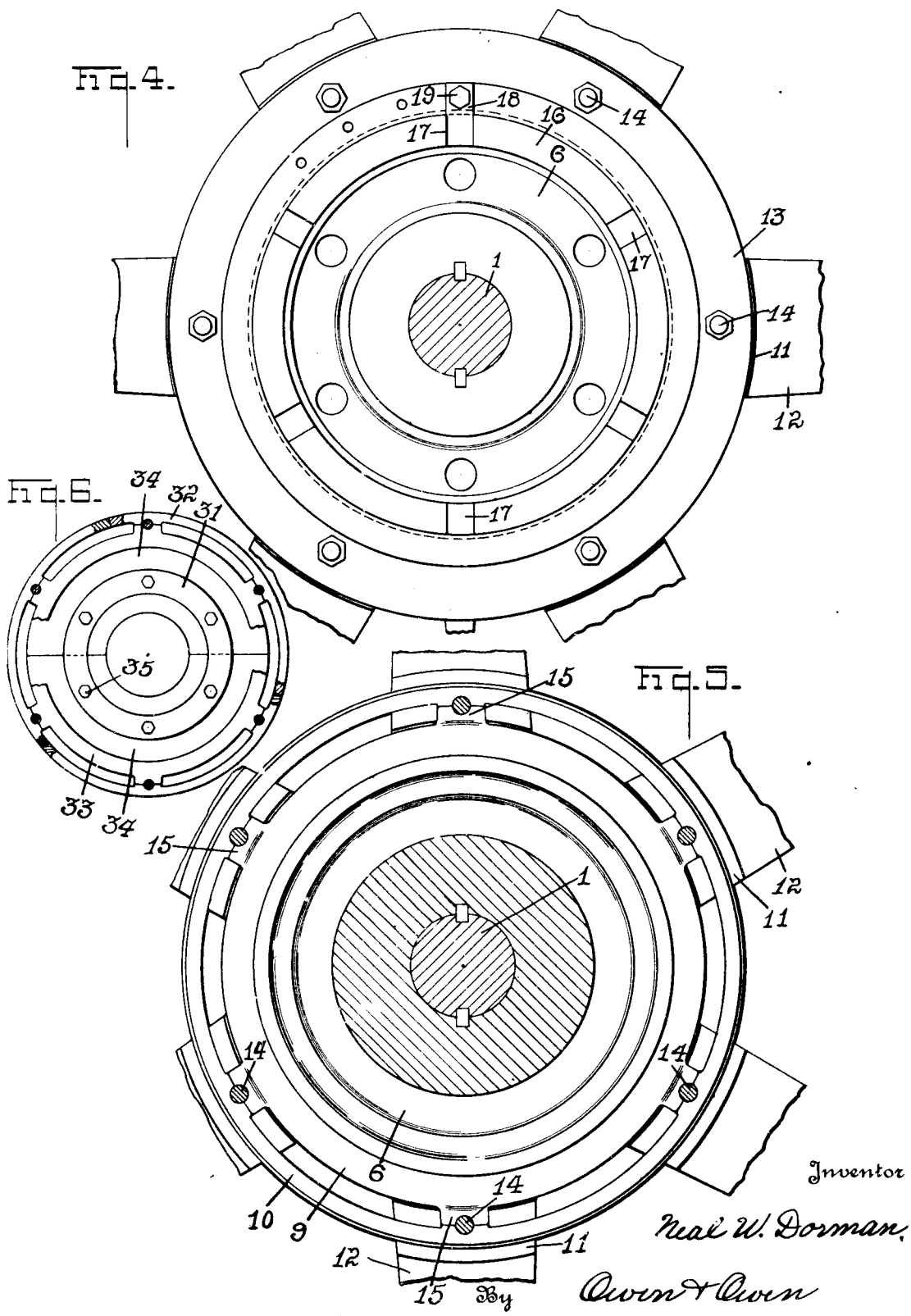

Patented Mar. 26, 1929.

1,706,600

UNITED STATES PATENT OFFICE.

NEAL W. DORMAN, OF TOLEDO, OHIO, ASSIGNOR TO THE TOLEDO MACHINE & TOOL COMPANY, OF TOLEDO, OHIO, A CORPORATION OF OHIO.

CLUTCH.

Application filed October 29, 1925. Serial No. 65,526.

This invention relates to clutches of the friction type, and has primarily for its object the provision of a clutch of this character, the clutch parts of which may be rendered easily accessible to permit a re-lining of the same without necessitating either the removal of the associated fly-wheel from its shaft or the removal of the shaft from its bearing.

Further objects of the invention reside in the manner of assembling the parts, whereby few holding or securing parts are required; the construction and arrangement of the clutch parts, whereby heating of the same is reduced to a minimum; the manner of adjusting the coacting clutch parts to secure a proper action thereof and to compensate for wear, and the manner of connecting the clutch control means with the clutch parts through the fly-wheel, whereby a novel and compact assembly is obtained.

The invention is fully described in the following specification, and while in its broader aspect it is capable of embodiment in numerous forms, a preferred embodiment thereof is illustrated in the accompanying drawings, in which,—

Figure 1:
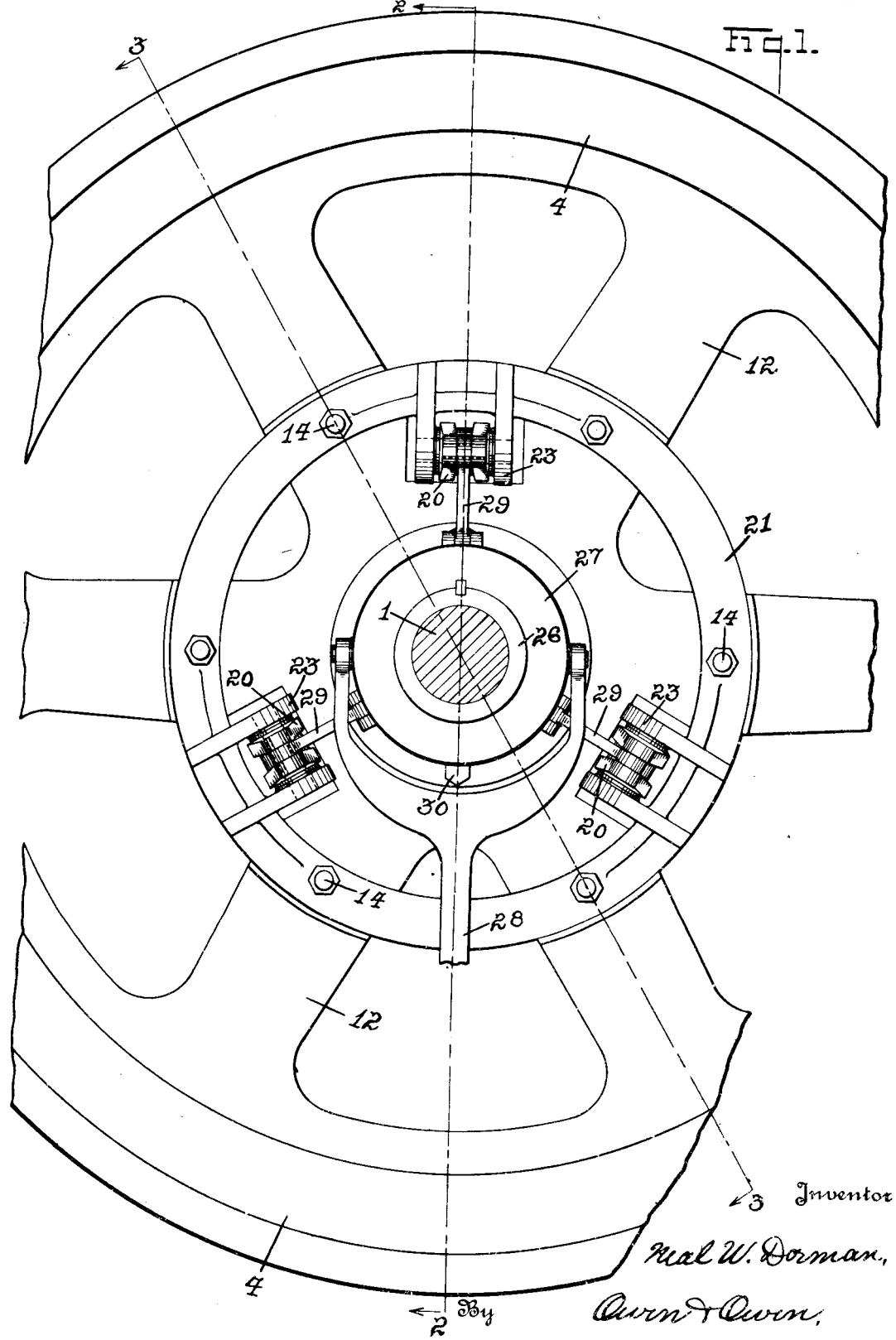
Figure 2:
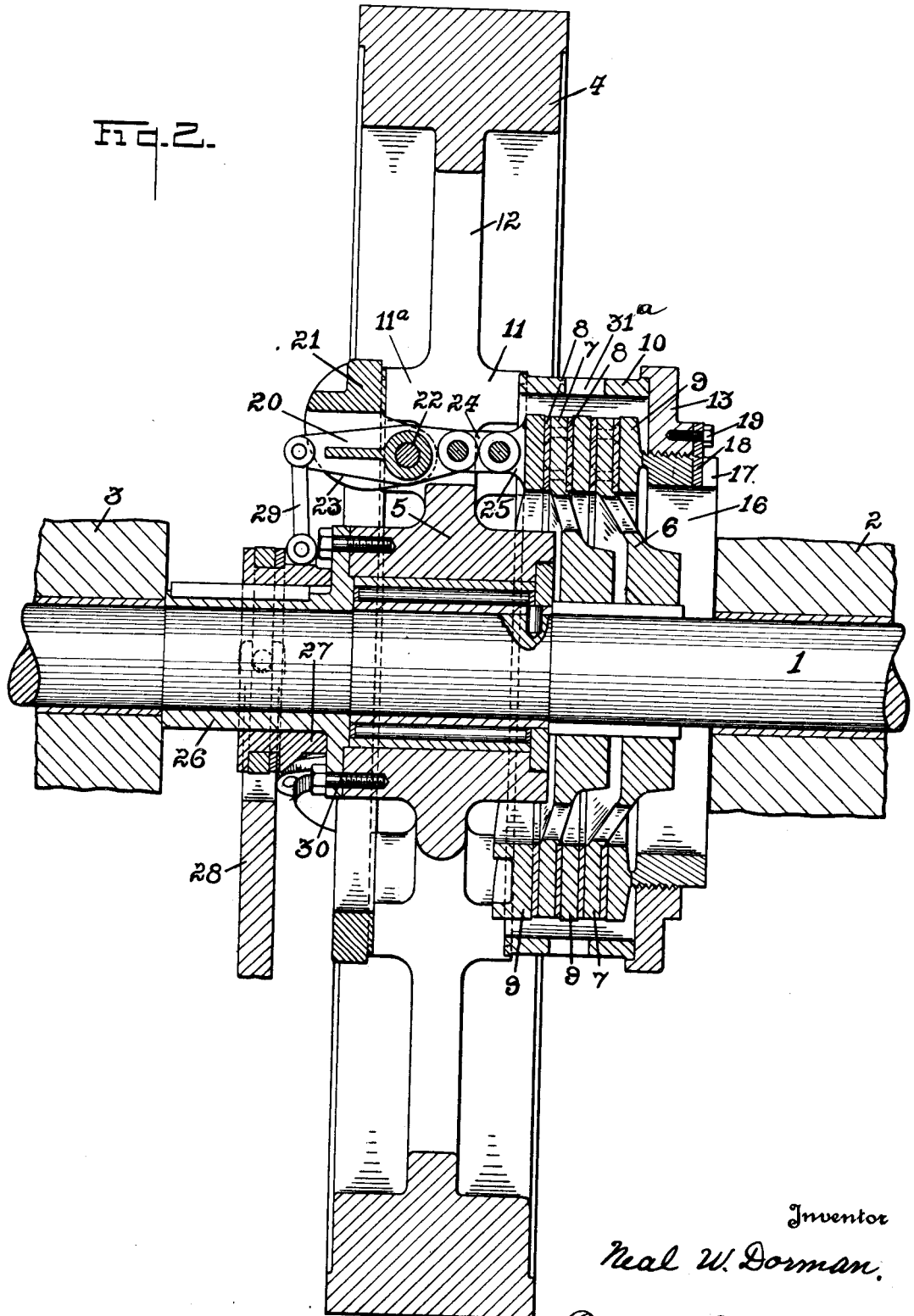

Figure 1 is an elevation of a fly-wheel having the clutch embodying the invention associated therewith, the view being taken at the clutch control side of the wheel, and with the shaft in section. Figs. 2 and 3 are sections taken respectively on the lines 2—2 and 3—3 in Fig. 1. Figs. 4 and 5 are sections respectively on the lines 4—4 and 5—5 in Fig. 3, and Fig. 6 is a detail on a reduced scale of a slightly modified form of the clutch.

Referring to the drawings, 1 designates a shaft journalled in bearings 2 and 3, and 4 is the drive member for the shaft, which, in the present instance, is illustrated in the form of a fly-wheel adapted to be belt-driven and has a roller bearing on the shaft, intermediate the bearings 2 and 3, to permit a free turning of the same thereon.

Keyed to the shaft 1 at one end of the wheel hub 5 for axial sliding or floating movements on the shaft are one or more clutch spiders 6, in the present instance two in number, each having an outer radially disposed clutch rim portion 7, which is faced at opposite sides with a suitable lining material 8, which lining is riveted or otherwise suitably fixed to the spider rims. A plurality of discs 9 are carried by the fly-wheel 4 for turning movements therewith and cooperate with the clutch rim portions of the spiders 6 so that when the clutch discs are tightened or clamped thereagainst the wheel and shaft are caused to turn together, as well understood in the art. The clutch discs 9, in the present instance, are three in number, one being disposed between the adjacent faces of the two spider rims 7, and one being disposed at the outer or opposite side of each spider rim, and all are mounted for axial floating movements relative to the wheel so that an application of inward pressure on the two outer clutch discs will effect a clamping or frictional engagement of the clutch discs with the rim portions of the spiders.

A cylindrical drum or housing member 10 encircles the spider rims 7 and clutch discs 9 and seats at its inner edge against a boss 11 on the adjacent side of each spoke 12 of the fly-wheel, and has its outer edge engaged by a clamping collar 13, the outer edge of which is inwardly flanged over the edge of the housing member. A plurality of bolts 14, in the present instance one for each spoke of the fly-wheel, project through aligned apertures in the collar 13 and boss or enlargement 11 of the fly-wheel spokes and serve to hold the parts in assembled relation. Each clutch disc 9 is provided with an outer peripheral ear or projection 15 for each bolt 14, which ear or projection abuts against the inner side of the housing drum 10. An aperture is provided transversely through the outer end of each ear and the inner side of the housing drum, with half in each, to receive the associated bolt 14, as shown in Fig. 5. In this manner the bolts 14 not only operate to clamp the clutch housing parts to the fly-wheel, but also anchor the clutch discs 9 and drum 10 against turning relative to each other and to the wheel.

The outward thrust of the outer clutch disc 9 with respect to the wheel side is opposed by a collar 16 which surrounds the shaft 1 in spaced relation thereto and is threaded into the collar 13 to permit axial adjustment of the thrust collar therein. The width or axial length of the collar 16 is greater than that of the housing collar 13 and its outer edge is provided in equi-distantly spaced relation therearound with a plurality of notches or incuts 17 into which a locking finger 18, Figs. 2 and 4, secured to the outer side of the housing collar 13 by a screw 19, may be projected to lock the thrust collar in adjusted relation to the housing.

The control means for the clutch includes a plurality of levers 20, three in the present instance, arranged in equidistantly spaced relation around the shaft and carried by a ring 21 which is clamped to the opposite side of the fly-wheel 4 to the clutch housing parts 10 and 13 by the bolts 14, which project through apertures in said ring, as shown in Fig. 3. The ring 21 seats against bosses 11$^a$ on the sides of the fly-wheel spokes 12 opposed to the bosses 11 and are held thereby in centered relation to the wheel axis. The levers 20 are disposed lengthwise of the shaft and each is mounted on a fulcrum pin 22 between a respective pair of ears 23 at the inner portion of the ring 21. The inner end of each lever 20 is connected by a link 24 to a respective boss 25 on the inner side of the innermost clutch disc 9, the connection being such that when the lever and link are in substantially straightened relation, as shown in Fig. 2, the discs 9 are caused to have clamping engagement with the rim portions of the spiders 6, and when the lever 20 is rocked from this position the innermost clutch disc 9 is moved inward to effect a release of the clutch parts, as is apparent.

A collar 26 is secured to the end of the wheel hub 5 adjacent to the outer ends of the levers 20, forming an extension of such hub end and providing a bearing on which a shifting collar 27 is feathered for limited axial sliding movements. The collar 27 is axially shifted by the engagement of a control lever 28 therewith in a well-known manner, and a link connection 29 is provided between the collar 27 and the outer end of each lever 20 whereby a shifting of the collar will impart clutch releasing or engaging movements to the levers. The collar 26 is secured to the hub of the fly-wheel by screws 30.

It is apparent that with this clutch the housing parts 10 and 13 and the ring 21 are secured in assembled relation to the fly-wheel by a single set of bolts 14, and that if it is desired to re-line the clutch rim portions of the spiders 6, this may be easily and quickly done without removing either the shaft 1 from its bearings or the wheel 4 therefrom by simply releasing the bolts 14 and drawing the housing collar 13 and drum 10 outwardly from the wheel so as to expose the spider rims to permit removal of the worn lining members and the substitution of new lining members therefor. After this is done, the housing parts may be again assembled and secured in rigid relation to the fly-wheel by the bolts 14. Should the bearing 2 be of such a nature as to prevent the outer withdrawal of the collar 13 and drum 10, so as to expose and permit a separation of the clutch parts, the drum 10 may be made in a plurality of end-abutting sections, as shown in Fig. 6, so that when the collar 13 is withdrawn sufficiently to release the drum sections, such sections may be removed from around the clutch parts. In such case the spiders 6 should be made in two sections which are clamped together around the shaft by a ring 31, as shown in Fig. 6, to permit separate lateral removal thereof from the shaft, thereby facilitating replacement of the lining members. In Fig. 6 the drum sections are designated 32, the clutch discs 33 and the spider sections as 34, the ring 31 being mounted on the hub of the spider and secured thereto by screws 35 to retain the spider sections in assembled relation.

The attaching of the drum parts 10 and 13 to turn with the continuously rotating member 4 is important in effecting a cooling of the clutch engaging parts so as to prevent burning out of the lining members. This cooling is accomplished by reason of the circulation of air set up within and around the housing parts 10 and 13 and around the clutch members by the rapid rotation of the housing and clutch discs, and this action is facilitated by providing the drum 10 at intervals with openings 31$^a$ therethrough for the passage of the circulating air.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. The combination with a shaft and member rotatable thereon, of a clutch spider mounted on the shaft for turning movements therewith, a clutch disc rotatable with the member and axially movable relative thereto to engage and release the spider, said clutch spider and clutch disc being disposed on one side of said member, control means on the opposite side of said member extending through said member and engaging said disc, a housing at the opposite side of said member and embracing said clutch disc and spider, said housing comprising a drum, and a collar adjustably connected to said drum to oppose the thrust of said control means.

2. The combination with a shaft and a member rotatable thereon, of a clutch spider mounted on the shaft for turning movements therewith, clutch discs rotatable with the member and axially movable relative thereto to engage and release the spider, means rotatable with the member and operable to engage and release the clutch discs, a housing fixed to the member and comprising a clutch embracing drum and an inturned annular portion at the outer end thereof, a collar threaded within the inturned annular portion of the housing and coacting with the discs to oppose the thrust of the operating means thereon, said collar having turning adjusting movements, and means for locking the collar in various adjusted positions to the housing.

3. The combination with a shaft and a member mounted for free rotation thereon, of a clutch housing at a side of said member comprising a clamping collar, and a drum interposed between the collar and member and both being in concentric relation to the member axis, a ring disposed at the opposite side of said member and concentric with its axis, a set of bolts extending through said collar, drum and ring to clamp the housing parts and ring to the member, a set of clutch discs mounted within the housing for axial floating movements and anchored against turning movements relative thereto, at least one clutch spider mounted on the shaft for clutch engagement with the discs, and control means for the clutch discs operable through the member from the opposite side thereof to the discs and having a part carried by said ring.

4. The combination with a shaft and member rotatable thereon, of a clutch spider mounted on the shaft for turning movements therewith, a clutch disc rotatable with the member and movable axially relative thereto to engage and release the spider, a housing for said clutch disc and spider, said clutch spider, clutch disc and housing being disposed on one side of said member, control means on the opposite side of said member extending through said member and engaging the innermost disc, a ring providing a support for said control means disposed at the opposite side of said member and concentric with its axis, a set of bolts extending through the housing, member and ring to clamp said housing and ring to said member whereby removal of said bolts enables said housing to be moved to permit ready access to the clutch disc and spider.

In testimony whereof I have hereunto signed my name to this specification.

NEAL W. DORMAN